(12) United States Patent
Stribaek et al.

(10) Patent No.: US 8,190,665 B2
(45) Date of Patent: May 29, 2012

(54) RANDOM CACHE LINE REFILL

(75) Inventors: Morten Stribaek, Frederiksberg (DK); Jakob Schou Jensen, Copenhagen (DK); Jean-Francois Dhem, Aix-en-Provence (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 1224 days.

(21) Appl. No.: 11/943,751

(22) Filed: Nov. 21, 2007

(65) Prior Publication Data

US 2008/0133629 A1 Jun. 5, 2008

Related U.S. Application Data

(63) Continuation of application No. 10/141,926, filed on May 10, 2002, now Pat. No. 7,310,706.

(60) Provisional application No. 60/294,605, filed on Jun. 1, 2001.

(51) Int. Cl.
*G06G 1/02* (2006.01)
*G06F 11/30* (2006.01)
*H04L 9/00* (2006.01)

(52) U.S. Cl. ............ 708/250; 380/46; 713/190

(58) Field of Classification Search ............ 708/250, 708/252, 253, 256
See application file for complete search history.

(56) References Cited

U.S. PATENT DOCUMENTS

| | | | |
|---|---|---|---|
| 3,866,183 A | 2/1975 | Lange | |
| 4,056,845 A | 11/1977 | Churchill, Jr. | |
| 4,084,230 A | 4/1978 | Matick | |
| 4,400,774 A | 8/1983 | Toy | |
| 4,493,026 A | 1/1985 | Olnowich | |
| 4,527,232 A | 7/1985 | Bechtolsheim | |
| 4,532,587 A | 7/1985 | Roskell et al. | |
| 4,587,610 A | 5/1986 | Rodman | |
| 4,646,233 A | 2/1987 | Weatherford et al. | |
| 4,677,546 A | 6/1987 | Freeman et al. | |
| 4,794,524 A | 12/1988 | Carberry et al. | |
| 4,814,981 A | 3/1989 | Rubinfeld | |
| 4,847,758 A | 7/1989 | Olson et al. | |
| 4,882,673 A | 11/1989 | Witt | |
| 4,949,252 A | 8/1990 | Hauge | |
| 4,953,073 A | 8/1990 | Moussouris et al. | |
| 4,954,944 A | 9/1990 | Ikeda | |
| 4,959,777 A | 9/1990 | Holman, Jr. | |
| 4,972,338 A | 11/1990 | Crawford et al. | |
| 4,989,140 A | 1/1991 | Nishimukai et al. | |
| 5,014,195 A | 5/1991 | Farrell et al. | |
| 5,034,885 A | 7/1991 | Matoba et al. | |
| 5,067,078 A | 11/1991 | Talgam et al. | |
| 5,095,424 A | 3/1992 | Woffinden et al. | |
| 5,146,582 A | 9/1992 | Begun | |

(Continued)

OTHER PUBLICATIONS

"An Introduction to Cache Memory Systems and the TMS 2150." *Texas Instruments Applications Briefs*. pp. 1-8 (Sep. 1982).

(Continued)

*Primary Examiner* — Chuong D Ngo
(74) *Attorney, Agent, or Firm* — Sterne, Kessler, Goldstein & Fox P.L.L.C.

(57) ABSTRACT

A microprocessor including random cache line refill ordering to lessen side channel leakage in a cache line and thus thwart cryptanalysis attacks such as timing attacks, power analysis attacks, and probe attacks. A random sequence generator is used to randomize the order in which memory locations are read when filling a cache line.

10 Claims, 7 Drawing Sheets

$$f(rand_n, mask_n) = \begin{cases} !mask_n[3] \& (rand_n[3] | (mask_n[2] \& (rand_n[2] | mask_n[1] \& (rand_n[1] | mask_n[0] \& rand_n[0]))))), \\ !mask_n[2] \& (rand_n[2] | (mask_n[1] \& (rand_n[1] | mask_n[0] \& (rand_n[0] | mask_n[3] \& rand_n[3]))))), \\ !mask_n[1] \& (rand_n[1] | (mask_n[0] \& (rand_n[0] | mask_n[3] \& (rand_n[3] | mask_n[2] \& rand_n[2]))))), \\ !mask_n[0] \& (rand_n[0] | (mask_n[3] \& (rand_n[3] | mask_n[2] \& (rand_n[2] | mask_n[1] \& rand_n[1]))))) \end{cases}$$

U.S. PATENT DOCUMENTS

| | | | |
|---|---|---|---|
| 5,148,536 | A | 9/1992 | Witek et al. |
| 5,148,538 | A | 9/1992 | Celtruda et al. |
| 5,168,560 | A | 12/1992 | Robinson et al. |
| 5,175,859 | A | 12/1992 | Miller et al. |
| 5,179,679 | A | 1/1993 | Shoemaker |
| 5,179,709 | A | 1/1993 | Bailey et al. |
| 5,210,842 | A | 5/1993 | Sood |
| 5,226,150 | A | 7/1993 | Callander et al. |
| 5,361,391 | A | 11/1994 | Westberg |
| 5,519,736 | A * | 5/1996 | Ishida ................. 375/367 |
| 5,532,695 | A * | 7/1996 | Park et al. ............. 341/173 |
| 5,926,070 | A * | 7/1999 | Barron et al. ........... 331/78 |
| 5,937,429 | A | 8/1999 | Kumar et al. |
| 6,081,873 | A | 6/2000 | Hetherington et al. |
| 6,324,632 | B1 | 11/2001 | McIntosh-Smith |
| 6,338,124 | B1 | 1/2002 | Arimilli et al. |
| 6,385,697 | B1 | 5/2002 | Miyazaki |
| 6,490,654 | B2 | 12/2002 | Wickeraad et al. |
| 6,490,655 | B1 | 12/2002 | Kershaw |

OTHER PUBLICATIONS

Brandt et al., "High Speed Buffer with Dual Directories," *IBM Technical Disclosure Bulletin*, 26(12):6264 (May 1984).

Cushman, "Enhanced µPs Bring New Life to Old Devices," *Electrical Design News*, pp. 124-138 (Jan. 1985).

"Dual Buses, Cache and Floating-Point Match Lift 32-bit Chip Set to 5 MIPS," *Electronic Design*, pp. 41-42 (Oct. 3, 1985).

Goodman, "Using Cache Memory to Reduce Processor-Memory Traffic," *Proc. of the 10th Ann. Intl. Symposium on Computer Architecture*, pp. 124-131 (Jun. 1983).

Kaplan et al., "Cache-Based Computer Systems," *Computer*, pp. 30-36; (Mar. 1973).

Office Communication, dated Aug. 2, 2005, for U.S. Appl. No. 10/141,926, filed May 10, 2002, 9 pages.

Office Communication, dated Mar. 29, 2006, for U.S. Appl. No. 10/141,926, filed May 10, 2002, 10 pages.

Office Communication, dated Aug. 18, 2006, for U.S. Appl. No. 10/141,926, filed May 10, 2002, 8 pages.

Rhodes, "Caches Keep Main Memories from Slowing Down Fat CPUs," Reprinted from *Electronic Design*, pp. 179-184 (Jan. 21, 1982).

Rhodes et al., "Cache-Memory Functions Surface on VLSI Chip," *Design*, pp. 159-163 Reprinted from *Electronic Design* (Feb. 1982).

Sachs et al., "A High Performance 846,000 Transistor Unix Engine—The Fairchild Clipper™," Proceedings of IEEE Intl. Conference on Computer Design, pp. 342-346 (Oct. 1985).

Smith et al., "A Study of Instruction Cache Organizations and Replacement Policies," *Proceeding of 10th Annual International Symposium on Computer Architecture*, pp. 132-137 (Jun. 1983).

Strecker, "Cache Memories for PDP-11 Family Computers," *Proceedings of 3rd Annual Symposium on Computer Architecture*, pp. 155-158 (Jan. 1976).

Strecker, "Cache Memories for PDP-11 Family Computers," Computer Engineering A DEC View of Hardware Systems Design, Digital Press, pp. 263-267 (1978).

"TMS2150 Cache Address Comparator." Texas Instruments Production Data document, (Sep. 1985).

VanAken, "Match Cache Architecture to the Computer System," Reprinted from *Electronic Design*, pp. 93-98 (Mar. 1982).

\* cited by examiner $$f(rand_n, mask_n) = \begin{cases} !mask_n[3] \& (rand_n[3] | (mask_n[2] | mask_n[2] \& (rand_n[2] | (mask_n[1] | mask_n[1] \& (rand_n[1] | (mask_n[0] | mask_n[0] \& rand_n[0]))))), \\ !mask_n[2] \& (rand_n[2] | (mask_n[1] \& (rand_n[1] | (mask_n[0] | (rand_n[0] \& (mask_n[3] | mask_n[3] \& rand_n[3]))))), \\ !mask_n[1] \& (rand_n[1] | (mask_n[0] \& (rand_n[0] | (mask_n[3] \& (rand_n[3] | (mask_n[2] | mask_n[2] \& rand_n[2]))))), \\ !mask_n[0] \& (rand_n[0] | (mask_n[3] \& (rand_n[3] | (mask_n[2] \& (rand_n[2] | (mask_n[1] | mask_n[1] \& rand_n[1]))))) \end{cases}$$

FIG. 4

RANDOM CACHE LINE REFILL

CROSS REFERENCE TO RELATED APPLICATIONS

This application is a continuation of U.S. application Ser. No. 10/141,926, filed May 10, 2002, now U.S. Pat. No. 7,310,706, which claims the benefit of U.S. Provisional Application No. 60/294,605, filed Jun. 1, 2001, each of which is hereby incorporated by reference in its entirety.

TECHNICAL FIELD

This invention relates to a technique for increasing processor security, and more particularly to a technique for using random word order on cache line refill to reduce the possibility of an attacker being able to reveal code or data in a system.

BACKGROUND

Traditional cryptanalysis has focused predominantly on exploiting underlying algorithms and/or protocols used to encrypt data. Even though an encryption scheme may be theoretically secure, it still may be possible to decrypt data using information obtained regarding the execution of a cryptographic algorithm. Information obtained from the operation of a cryptographic device, such as a computer or smart card, that may be used to identify and/or deduce secret information is called side-channel leakage.

Many different techniques have been developed to obtain and exploit side-channel leakage including timing attacks, power attacks, and fault generation; however, side-channel information may also be obtained through more direct means. For example, probe attacks may be used to read secret information on the bus of a processor by attaching conductors to circuits of the processor. When a cryptographic algorithm is using a secret key to perform an operation, that secret key (e.g., a personal identification number (PIN)) may be loaded into a data cache. An attacker could use probes to either passively or actively determine the secret key as the data is loaded into the cache. Using knowledge about the underlying cryptographic algorithm, a probe attack may be used to identify secret information by identifying instructions and/or data loaded into a cache.

A smart card may contain confidential information (e.g., social security number, credit card numbers, account numbers, date of birth) and may even contain stored value that resembles cash. The data stored on the smart card can be protected by a PIN using standard cryptographic methods. An attacker, using knowledge of the underlying cryptographic algorithms, may be able to exploit that knowledge and view the confidential information by watching data cross the bus as the data is loaded from memory into the cache. Additionally, data obtained using a probe attack may be combined with timing and power analysis data to effectively defeat the security of the smart card.

By exploiting side-channel leakage, an attacker may be able to compromise the security of cryptographic devices even though the underlying algorithms and protocols used by these devices are theoretically secure.

SUMMARY

In one general aspect, a microprocessor supporting random cache line refill ordering is provided. The microprocessor includes multiple memory addresses and at least one cache controlled by a cache controller and having multiple cache lines for storing the contents of memory addresses. Random cache line refill order logic is provided to translate a burst read request made by the cache controller into a randomly-ordered sequence of read requests based on one or more random values that are generated by a random number generator.

In some implementations, the random cache line refill order logic is controlled by a random cache line refill order signal such that random cache line refill order logic is enabled when the random cache line refill order signal is asserted.

Implementations of random cache line refill ordering may be provided for data caches, instruction caches, and any combination thereof. Random cache line refill ordering may be used with any cache structure including a direct-mapped cache and a four-way set-associative cache.

In some implementations, random cache line refill order logic includes a random sequence generator such that the random cache line refill order logic is operable to translate a burst read request made by the cache controller into a randomly ordered sequence of read requests using the random sequence generator. The random sequence generator may randomize a sequence of n elements by successively choosing one of the n random elements and, if the element has previously been chosen, then instead choosing the first unchosen element in the sequence. Some microprocessors may include a bus interface unit to provide an interface to the memory.

The details of one or more implementations are set forth in the accompanying drawings and the description below. Other features and advantages will be apparent from the description and drawings, and from the claims.

DESCRIPTION OF DRAWINGS

FIG. 4 is a function used to randomly determine a sequence of memory reads in response to a burst read request.

DETAILED DESCRIPTION

If the order in which data and instructions are loaded into a cache is entirely deterministic, then an attacker may be able to extract secret information by reading instructions and/or data as they are loaded into a cache. For example, a direct-mapped cache may store four words per cache line. When a cache miss occurs, the system determines which cache line to refill and then loads new words into that cache line. Randomizing the load sequence of a cache line refill increases the security of a processor by making it more difficult for an attacker to obtain secret information by reading data and/or instructions as they are loaded into a cache.

Figure 1:
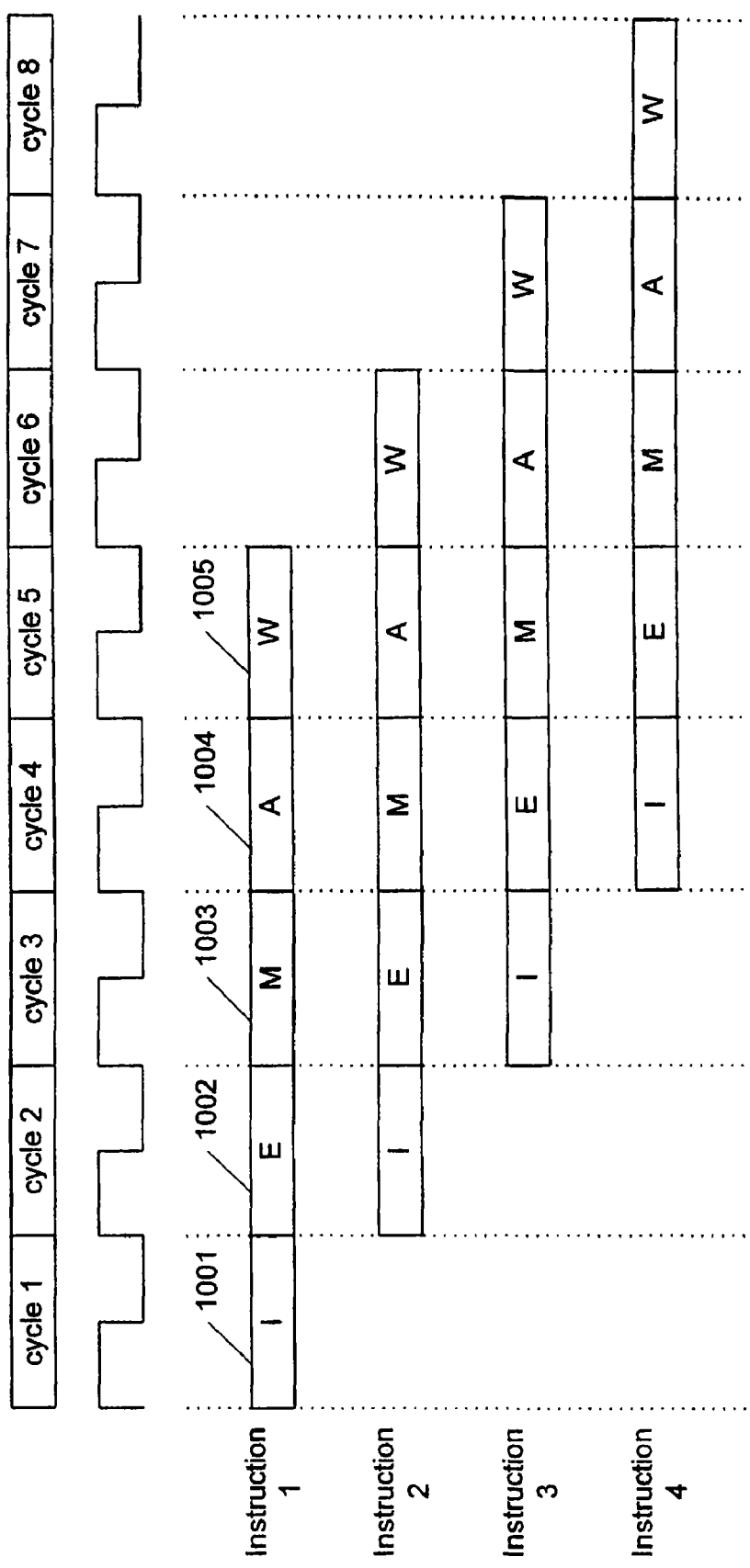
FIG. 1 is a timing diagram of an exemplary five-stage pipeline that may be used in a RISC architecture.

Referring to FIG. 1, an exemplary microprocessor architecture that may implement random cache line refill order includes a five-stage pipeline in which each instruction is executed in a fixed amount of time, such as, for example, five clock cycles. The execution of each instruction is divided into five stages: instruction fetch (I) stage 1001, execution (E)

stage 1002, memory fetch (M) stage 1003, align/accumulate (A) stage 1004, and writeback (W) stage 1005. In the I stage 1001, a specified instruction is fetched from an instruction cache. A portion of the fetched instruction may be used to specify source registers that may be used in executing the instruction. In the E stage 1002, the system fetches the contents of the specified source registers. These fetched values may be used to perform arithmetic or logical operations. The processor also uses the E stage to begin performing multiply/divide operations and arithmetic logic unit (ALU) operations.

In the M stage 1003, ALU operations complete and an executing instruction may cause memory to be read from a data cache. In the A stage 1004, loaded data is aligned with word boundaries and multiplier accumulations and carry propagations are performed. Finally, in the W stage 1005, values obtained by the execution of the instruction may be written back to a register.

In the I stage 1001, the processor attempts to fetch an instruction from an instruction cache (I-cache). If a cache miss occurs, the system loads the instruction from memory and stores it in the I-cache. Likewise, in the M stage 1003, the system attempts to fetch data from a data cache (D-cache). If a cache miss occurs, the system loads the data from memory and stores it in the D-cache.

Figure 2:
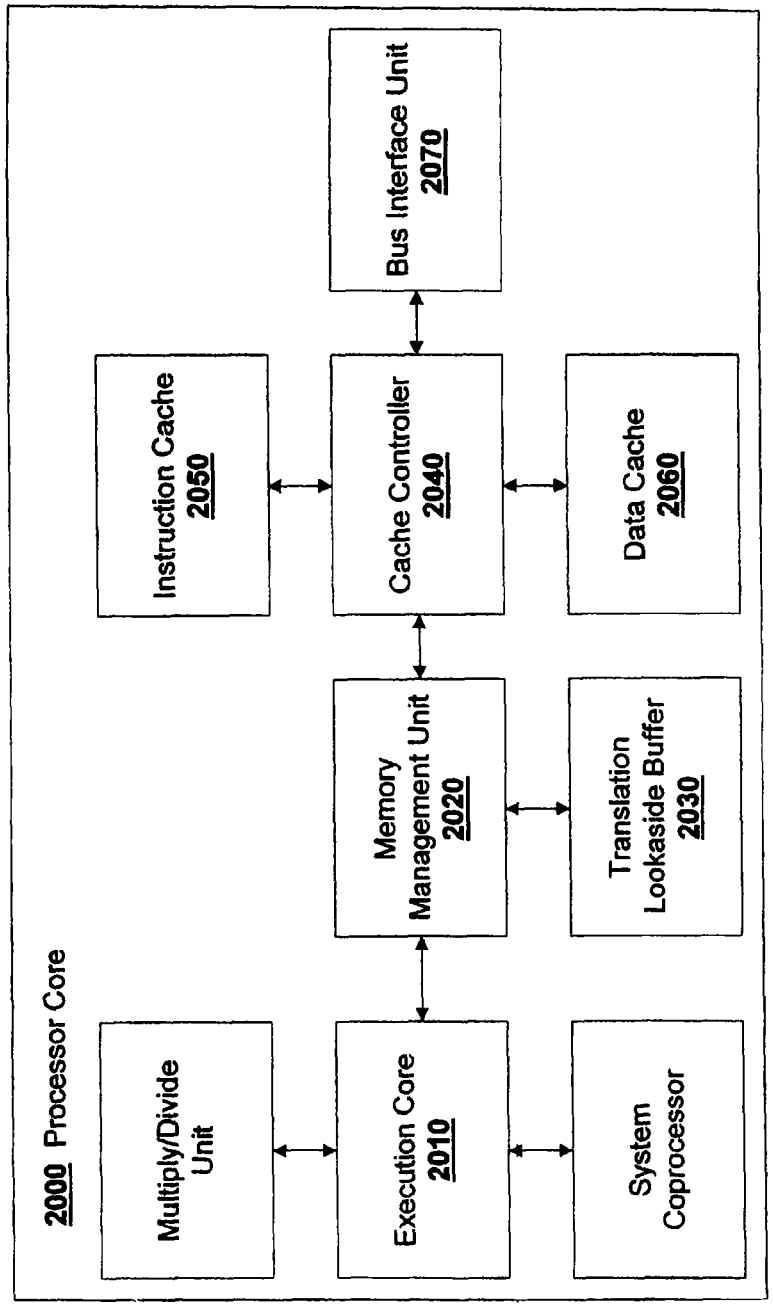
FIG. 2 is a block diagram of a processor core including an instruction cache and a data cache.

Referring to FIG. 2, a processor core 2000 includes execution core 2010, memory management unit 2020, translation lookaside buffer 2030, cache controller 2040, instruction cache 2050, data cache 2060, and bus interface unit 2070. Execution unit 2010 implements a load-store architecture with single-cycle arithmetic logic unit (ALU) operations. The core includes thirty two 32-bit general-purpose registers used for scalar integer operations and address calculation. The register file, which may include two read ports and one write port, may be fully bypassed to minimize operation latency in the pipeline. When execution core 2010 needs to fetch an instruction or access data that is not stored in a register, the execution core 2010 makes a request using memory management unit 2020.

Memory management unit 2020 uses translation lookaside buffer 2030 to provide an interface between execution core 2010 and cache controller 2040. Translation lookaside buffer 2030 acts as a cache for translations of virtual memory addresses to physical memory addresses. Using the translation lookaside buffer 2030, the memory management unit 2020 handles address translations, faults, virtual paging, and/or various other functions. When the memory management unit 2020 receives a request to read an instruction or data, it makes a request to cache controller 2040.

Cache controller 2040 provides an interface to instruction cache 2050 and data cache 2060. Each of these caches may be implemented using any cache technology. For example, each may be implemented as a 16 Kbyte cache that is virtually indexed and physically tagged, allowing virtual-to-physical address translation to occur in parallel with the cache access rather than having to wait for physical address translation. The tag holds, for example, 22 bits of the physical address, a valid bit, and a lock bit. In some implementations, the caches support cache locking on a per-line basis.

Bus interface unit 2070 controls the external interface signals. Additionally, the bus interface unit 2070 may include a write buffer, such as a 32-byte collapsing write buffer, to hold and combine write transactions before issuing them to the external interface. If the data caches follow a write-through cache policy, a write buffer may significantly reduce the number of write transactions on the external interface, and may reduce the amount of stalling in the core due to issuance of multiple writes in a short period of time.

Thus, for example, the execution core 2010 may fetch an instruction by sending a request to memory management unit 2020 which performs virtual to physical address translations. The memory management unit 2020 then sends a request to cache controller 2040. The cache controller 2040 looks up the instruction's address using instruction cache 2050. If the instruction is available in cache 2050, then it is returned to the execution core 2010. Otherwise, a cache miss occurs and a request sends through bus interface unit 2070 to refill a cache line to load the instruction into instruction cache 2050. To exploit temporal and spatial locality of instruction execution, it is often beneficial to load multiple instructions at one time. Thus, the bus interface unit 2070 is sent a burst read request to retrieve multiple instructions, which then are loaded into the cache. If an attacker is able to probe the system's bus, the data loaded into the cache and the order in which the data is loaded may yield significant information about the operations being executed.

In a typical direct-mapped cache, the cache line is refilled in linear wrapping order. The word causing the cache miss is the critical word. In linear wrapping order, the critical word is first loaded, and then each consecutive word in the cache line is loaded, wrapping to the beginning until the entire cache line has been filled. For example, in a four-word cache line including words 0-3, if word 1 is the critical word, then the cache is refilled in linear wrapping order as follows: word 1, word 2, word 3, word 0.

Figure 3:
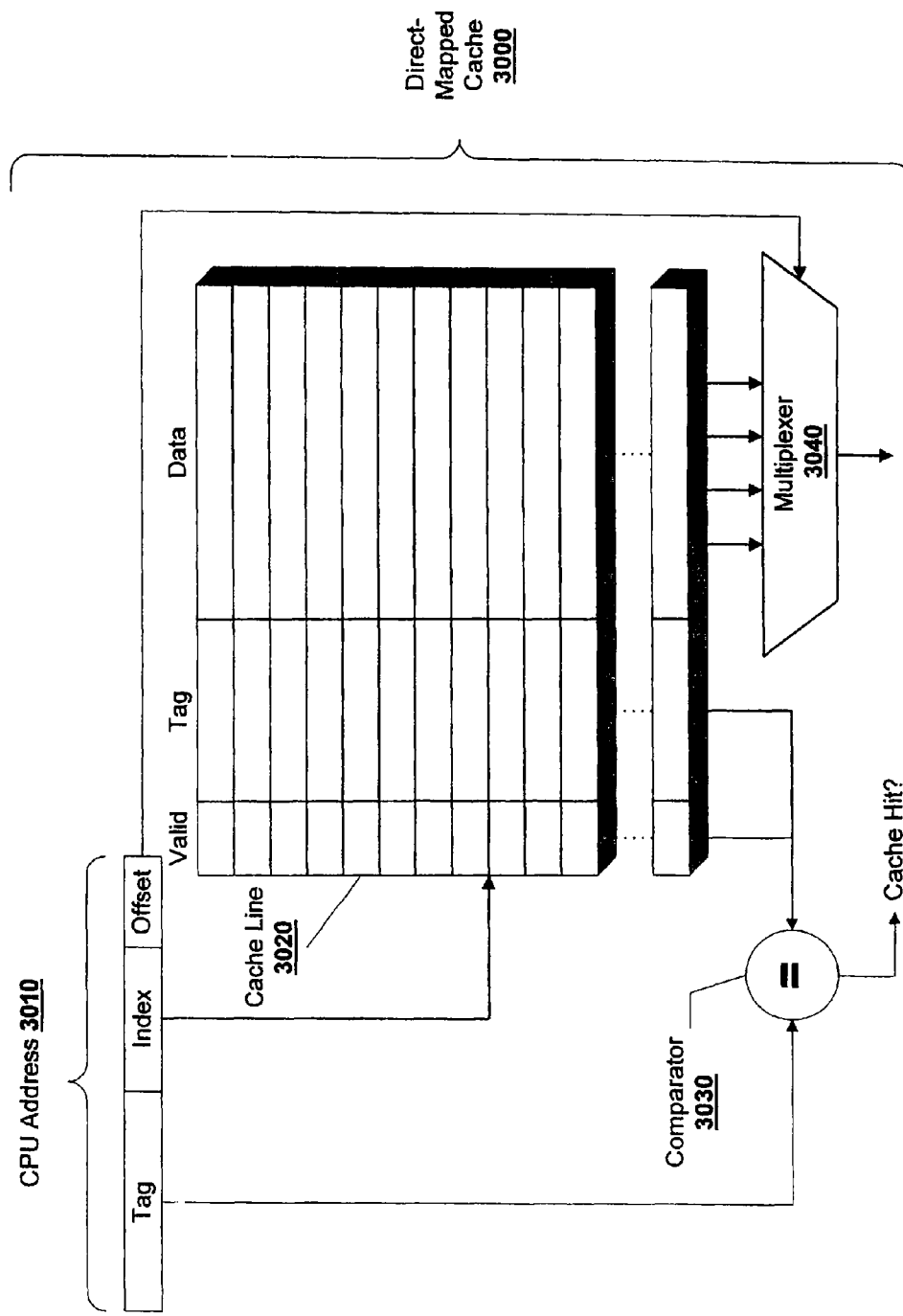
FIG. 3 is a diagram of an exemplary direct-mapped cache that may be used as an instruction cache or a data cache.

Referring to FIG. 3, a direct-mapped cache 3000 may be used as instruction cache 2050 or data cache 2060. The cache 3000 provides the ability to look up a central processing unit (CPU) address 3010 which, for purposes of the cache, is logically divided into a tag, an index, and an offset. The index is used to identify a particular line 3020 within the cache 3000 where the information may be stored. A cache line 3020 includes various flags that are used to manage the cache line (i.e., whether the data in the cache location remains valid), a tag, and data. In this example, four words are stored in each cache line and the offset is used to select the appropriate word within the cache line. Comparator 3030 is used to determine if the data is located within the cache 3000.

If the tag of CPU address 3010 and the tag of the appropriate cache line 3020 match and the cache line 3020 valid bits indicate that the data is still valid, then a cache hit occurs and the appropriate data is selected by multiplexer 3040 using the offset of CPU address 3010. If the tags do not match, or if the data is no longer valid, then a cache miss occurs and the appropriate cache line 3020 is refilled, reloading each word in the relevant cache line 3020.

The level of security in the system may be increased by randomizing the order in which cache line 3020 is refilled. In the example discussed above with respect to FIG. 3, a burst read request issued to refill the cache line results in four reads. It is desirable to randomize the sequence in which these reads are performed. It should be understood that the architecture discussed above is given for purposes of example only. Those of skill in the art will appreciate that random cacheline refilling may be implemented in any computer architecture incorporating a cache.

A sequence generator may be used to create sequences of any length based on a stream of numbers from a random number generator. For example, a random sequence of length four may be generated using a stream of 2-bit numbers from a pseudo random number generator. In this example, the sequence must contain each number (0-3) exactly once.

A random sequence generator may be implemented using the function shown in FIG. 4, where rand$_n$="Random number", n=[0,3];

$sel_n = f(rand_n, mask_n)$, n=[0,3];
$mask_0 = 0000$;
$mask_{n+1} = mask_n | sel_n$, n=[0,2];

and $rand_n$ and $sel_n$ are 4-bit one-hot encoded values in the range 0-3, $sel_n$ is the n'th value in the sequence, and $mask_n$ indicates which numbers have been in the sequence before the n'th value.

The function $f(rand_n, mask_n)$ shown in FIG. 4 is used to compute successive values of $sel_n$ based on the previous numbers ($mask_n$) and a random value ($rand_n$). An example of how the algorithm works is given in Table 1.

TABLE 1

| n | rand | mask | sel |
|---|------|------|-----|
| 0 | 1000 | 0000 | 1000 |
| 1 | 0010 | 1000 | 0010 |
| 2 | 0010 | 1010 | 0100 |
| 3 | 1000 | 1110 | 0001 |

In this example, we begin with random number "1000" and a mask of "0000". The function $f(rand_n, mask_n)$ shown in FIG. 4 returns "1000", identifying the first selection in the sequence. The mask is set to the logical OR of the previous mask and the selection (i.e., "1000") and the process continues. The next random number is "0010". Function $f(rand_1, mask_1)$ identifies the next selection in the sequence, "0010" and the mask is updated accordingly to "1010". In the next step, the random number is again "0010". Because the third selection has already been made, it can not be made again. Function $f(rand_2, mask_2)$ returns "0100" and the mask is updated to "1110". Finally, the remaining selection of "0001" is made based on the random number "1000".

Figure 5:
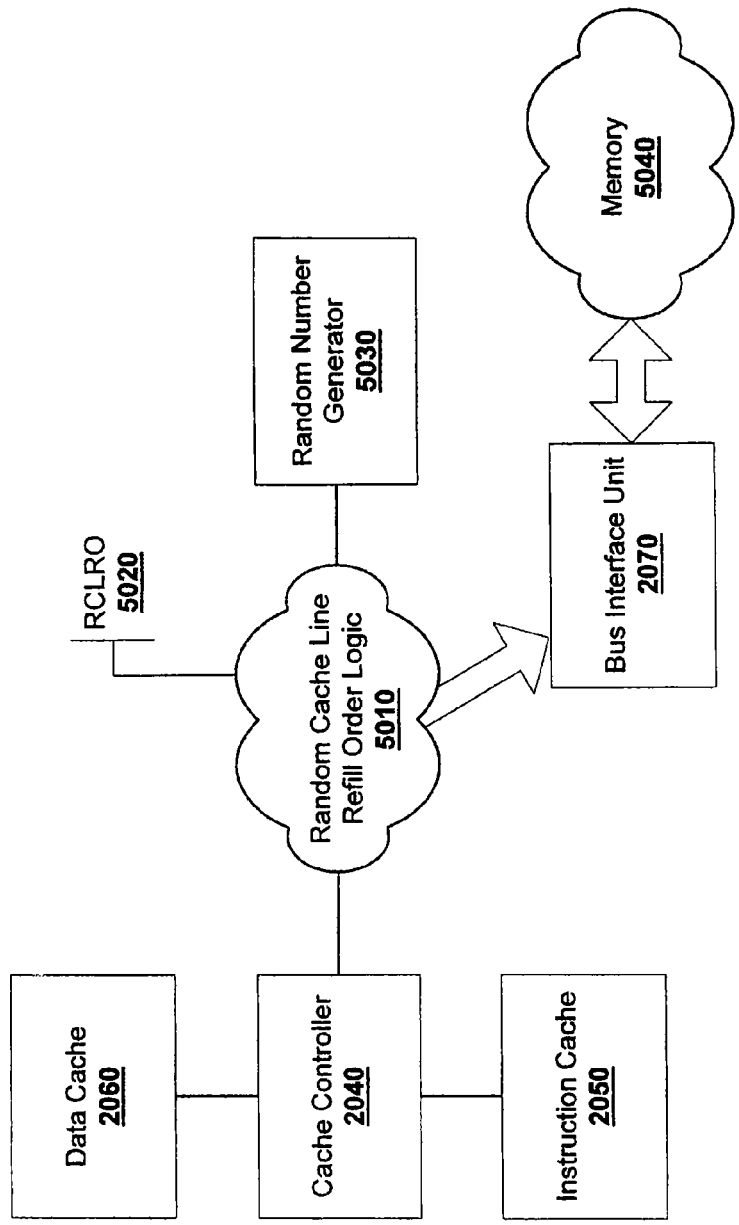
FIG. 5 is a block diagram of a random cache line refill order system that can be used to randomize a burst read request.

Referring to FIG. 5, random cache line refill ordering is implemented when the cache controller 2040 issues a burst read request to the bus interface unit 2070. When random cache line refill order is enabled, the bus interface unit translates a burst read into four single memory reads in a pseudo-random sequence. Referring to FIG. 5, random cache line refill order (RCLRO) logic 5010 may be used to implement the random sequence generation described above. When a RCLRO signal 5020 is asserted and a burst read request is made by cache controller 2040 to refill instruction cache 2050 or data cache 2060, the RCLRO logic 5010 uses random number generator 5030 to translate the burst request into individual randomly-ordered read requests that are sent to bus interface 2070. Then, bus interface 2070 reads the requested addresses from memory 5040 so that they can be loaded into the appropriate cache (2050 or 2060).

Figure 6:
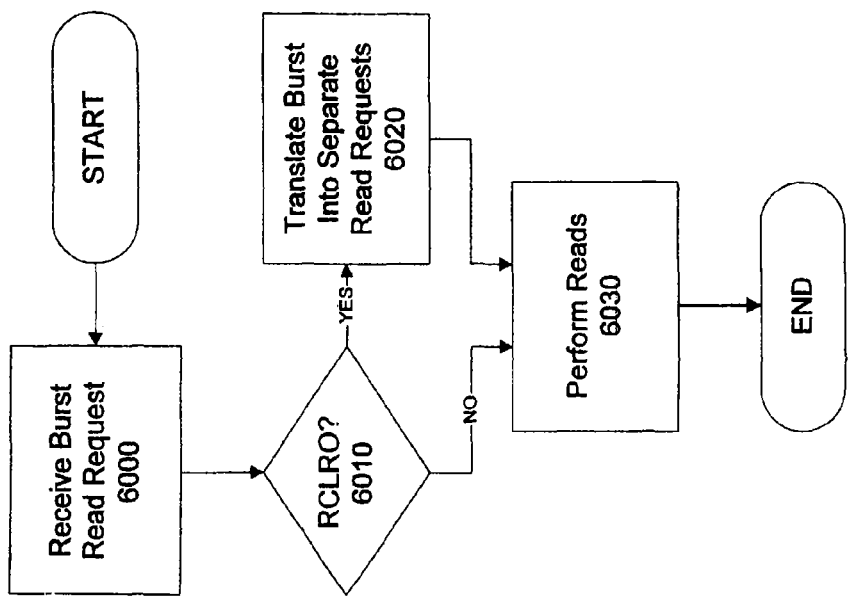
FIG. 6 is a flowchart of a process for translating a burst read request into a random sequence of separate read requests.

Referring to FIG. 6, random cache line refill order may be performed by first receiving a burst read request (step 6000) from a cache controller 2040. If random cache line refill ordering is enabled (step 6010), the system translates the burst read request into separate read requests in random sequence (step 6020). If random cache line refill ordering is not enabled, then the burst read requests are sent to the bus interface unit 2070. The bus interface unit 2070 then reads the requested memory locations and returns the data to the cache controller 2040 to refill the cache.

Figure 7:
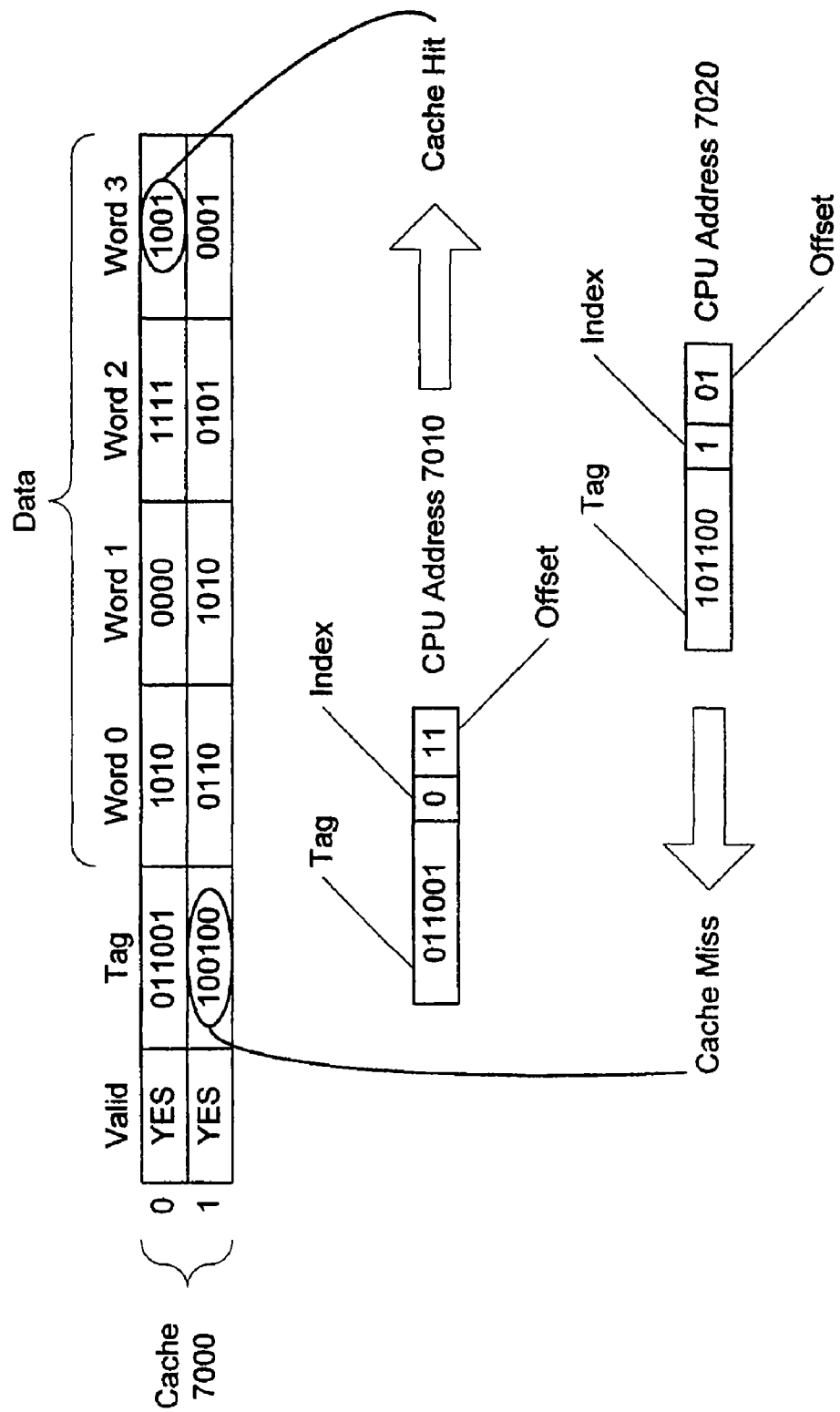
FIG. 7 is a diagram of a simplified random cache line refill order in a direct-mapped cache with four words per cache line.

Referring to FIG. 7, cache 7000 is a simplified example of random cache line refill ordering in a direct-mapped cache. In this example, the cache includes only two lines and holds four words per cache line. This cache is far too simple to be used in most applications; however, the principles described with reference to this example are applicable to any size cache in any configuration.

The cache shown in FIG. 7 is a direct-mapped cache with each cache line holding four words of data. A portion of each CPU word address is designated as an offset to select one of the four words within a cache line. In this example, the two low-order bits are chosen as the offset. Additionally, a portion of each CPU word address is designated as an index to identify the cache line where the address would be stored in the cache. In this example, the third low-order bit is used as the index.

CPU word address 7010 is "011001011". The low-order bits "11" are used as the offset to specify which word within the appropriate cache line may contain the address. The third low-order bit "0" is the index. Thus, the offset of "11" specifies that word 3 would contain the address and the index "0" indicates that the addresses would be contained in the first line of the cache. Because the tag stored at this location, "011001" matches and the entry is marked valid, a cache hit occurs and the data "1001" is returned.

CPU word address 7020 includes an offset of "01" and an index of "1". This identifies word 1, line 1 of the cache having a tag "100100". Because the tag does not match the tag of CPU word address 7020, "101100", a cache miss occurs. In response to a cache miss, a burst read request is made to read memory addresses "101100100", "101100101", "101100110", and "101100111" from memory. If random cache line refill order is selected, the request is translated into a random sequence of read requests. Data is then loaded in the generated random sequence order and stored in the cache line being refilled. For example, the random sequence may be as follows: word 2, word 1, word 3, word 0. If random cache line refill order is not selected, then the cache may be loaded in linear wrapping order beginning with the critical word as follows: word 1, word 2, word 3, word 0.

The techniques described above may be used with any cache structure. A processor's security may be improved by enabling random cache line refill order; however, the added security may come at a cost if the processor takes longer to refill a cache line in random word order.

In addition to random cache line refill order implementations using hardware, (e.g., within a microprocessor or microcontroller) implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claim.

What is claimed is:

1. A method for generating a random sequence to minimize side channel leakage during a cryptographic operation by a cryptographic device, the method, comprising:
   (1) generating a mask value based on a logical OR of an initial mask value and an initial selection value;
   (2) generating a random value;
   (3) generating a selection value based on the mask value and the random value; and
   (4) repeating steps (1) through (3) to form the random sequence, wherein steps (1) through (4) are performed by the cryptographic device.

2. The method of claim 1, wherein step (4) comprises repeating steps (1) through (3) to form a random sequence of N selection values.

3. The method of claim 1, wherein step (4) comprises repeating steps (1) through (3) to form a random sequence of N selection values, wherein no two selection values in the random sequence of N selection values are the same.

4. The method of claim 3 further comprising:
   (5) generating, for each selection value generated in step (4), a bus operation.

5. The method of claim 3, wherein the method is implemented in a processor, the method further comprising:
   (5) generating, for each selection value generated in step (4), a data read request, wherein the order of the data read requests correspond to a generation order of the selection values.

6. A method for generating a random sequence to minimize side channel leakage during a cryptographic operation by a cryptographic device, the method, comprising:
   (1) generating a mask value;
   (2) generating a random value;
   (3) generating a selection value based on the mask value and the random value, including a first bit of the selection value based on a logical NOT of a first bit of the mask value; and
   (4) repeating steps (1) through (3) to form the random sequence, wherein steps (1) through (4) are performed by the cryptographic device.

7. A method for generating a random sequence to minimize side channel leakage during a cryptographic operation by a cryptographic device, the method, comprising:
   generating a selection number based on a mask and a random value to form a random sequence of N selection values, wherein no two selection values are the same; and
   using the selection values, translating between a plurality of ordered bus requests and a pseudo-random sequence of individually randomly-ordered sequence of bus operations.

8. The method of claim 7, wherein the bus operations comprise the reading of instructions.

9. The method of claim 7, wherein the plurality of bus operations comprise the reading of data.

10. A method for generating a random sequence to minimize side channel leakage during a cryptographic operation by a cryptographic device, wherein the method is implemented in a processor, the method, comprising:
   (1) generating a mask value;
   (2) generating a random value;
   (3) generating a selection value based on the mask value and the random value;
   (4) repeating steps (1) through (3) to form the random sequence; and
   (5) generating, for each selection value generated in step (4), a data read request, wherein the order of the data read requests correspond to a generation order of the selection values.

* * * * *